(12) United States Patent
Griffiths et al.

(10) Patent No.: US 7,080,503 B2
(45) Date of Patent: Jul. 25, 2006

(54) CONTROL SYSTEM

(75) Inventors: Michael Griffiths, Bromsgrove (GB); Trevor Stanley Smith, Sutton Coldfield (GB)

(73) Assignee: Goodrich Control Systems Ltd. (GB)

( * ) Notice: Subject to any disclaimer, the term of this patent is extended or adjusted under 35 U.S.C. 154(b) by 308 days.

(21) Appl. No.: 10/389,440

(22) Filed: Mar. 14, 2003

(65) Prior Publication Data

US 2004/0177602 A1 Sep. 16, 2004

(30) Foreign Application Priority Data

Mar. 15, 2002 (GB) ................................. 0206222.2

(51) Int. Cl.
*F02C 9/26* (2006.01)

(52) U.S. Cl. ..................................... 60/39.281; 60/243

(58) Field of Classification Search ................ 60/39.27, 60/39.281, 243, 234
See application file for complete search history.

(56) References Cited

U.S. PATENT DOCUMENTS 3,319,418 A 5/1967 Bryant et al.
3,475,909 A * 11/1969 Warne ...................... 60/39.281
3,475,910 A * 11/1969 Warne ...................... 60/39.281
4,208,871 A * 6/1980 Riple ....................... 60/39.281
5,448,882 A 9/1995 Dyer et al.
6,321,527 B1 11/2001 Dyer et al.

FOREIGN PATENT DOCUMENTS

DE 44 18 680 11/1995
GB 2 289 722 5/1995

* cited by examiner

*Primary Examiner*—Louis J. Casaregola
(74) *Attorney, Agent, or Firm*—Andrus, Sceales, Starke & Sawall, LLP

(57) ABSTRACT

A fuel control system as claimed in claim 1 wherein, the pressure raising valve includes:
- a pressure raising valve member exposed to fuel pressure within a reference chamber,
- an inlet to which fuel at supply pressure is supplied, wherein the pressure raising valve member is movable against a force due to pressure within the reference chamber by means of fuel at supply pressure,
- an outlet through which fuel at delivery pressure is supplied to the engine, and
- feedback means for permitting fuel at delivery pressure to flow to the reference chamber.

There is also disclosed a pressure raising valve for use in such a system.

5 Claims, 6 Drawing Sheets

CONTROL SYSTEM

TECHNICAL FIELD

The present invention relates to a control system for controlling the supply of fuel to a combustion engine having one or more sets of burners.

Combustion engines, and in particular gas turbine engines, generally require a continuous, though often variable, flow of fuel to be supplied thereto in order to operate correctly. Fuel is pumped from a tank or other fuel store along a fuel line by means of a fuel pump and supplied to the engine at a predetermined pressure. The pump may be driven by means of a motor whose speed can be controlled so as to increase or decrease the flow rate of the fuel supplied to the engine by the pump.

Background Art

Conventionally, the fuel pumps used in fuel control systems for gas turbine engines comprise positive displacement pumps, such as a gear pump which has certain advantageous characteristics making it a preferred choice for use in gas turbine engine fuel systems. Specifically, the flow of fuel through a gear pump varies generally linearly with the speed of the pump. This is advantageous for gas turbine engine use if the pump is electrically driven, since it enables the supply of fuel to the burners in the engine to be controlled by adjusting the speed of the electric motor without requiring additional control valves or the like.

A disadvantage of conventional gear pumps is that they tend to wear out more rapidly if operated at high speeds. Typically the maximum speed for a conventional gear pump in a gas turbine engine fuel system is in the range 7000–13000 rpm. As Power=Torque×Speed it follows that at these relatively low speeds, a high torque is required to generate the power needed to pump the fuel. The need for high torque is particularly disadvantageous if the pump is electrically driven as a heavy electric motor is needed to generate the required high torque.

Another type of fuel pump is known as a centrifugal (CF) pump. CF pumps operate on a different principle to gear pumps and have the advantage that they are able to operate at rotational speeds much higher than conventional gear pumps. As a consequence, the torque required is much lower and hence a considerably smaller and lighter, electric motor can be used to drive the pump.

Fuel control systems for gas turbine engines commonly include a Pressure Raising Valve (PRV) which is arranged to set a predetermined, minimum fuel pressure within the fuel control system. It is usual to reference the PRV to the primary pump inlet pressure (LP) of the system, so that the PRV sets a minimum value for the difference between primary pump delivery pressure and primary pump inlet pressure (HP–LP). This minimum value is set to ensure that sufficient force can be generated to move various fuel control valves and engine actuators of the system before fuel flows to the engine. The use of a conventional PRV in conjunction with a CF pump produces a fuel flow through the CF pump that is not linear with pump speed, particularly at low pump speeds, where the gain between pump speed and flow is very high. Below a certain value of HP–LP the PRV closes and the fuel flow to the engine is zero. It is therefore difficult to use centrifugal pumps in fuel control systems where it is desired to control fuel supply by varying pump speed since this requires that the relationship between the speed of the pump and the fuel flow rate does not result in a high gain at low flows. Heretofore, CF pumps have been employed in fuel control systems where the pump is driven from the engine itself, i.e. at a speed which is related to the speed of the engine.

It would be advantageous to provide a method or apparatus by which a CF pump could be used in a fuel control system for a combustion engine which allows fuel supply to the engine to be varied by controlling the speed of the pump.

DISCLOSURE OF INVENTION

According to a first aspect of the present invention, there is provided a fuel control system for a combustion engine, the system comprising:
  an electrically driven centrifugal pump operable at a pump speed, wherein the pump is arranged to supply pressurised fuel to the engine, and
  a pressure raising valve for ensuring the pressure of fuel within the fuel control system is maintained above a predetermined, minimum amount, wherein the pressure raising valve is adapted to provide a substantially linear variation of fuel flow rate to the engine with pump speed.

The provision of such a linearised pressure raising valve ensures the flow rate can be controlled as a function of pump speed for both relatively low and relatively higher flow rates, i.e. across a range of flow rates. As a result of using a CF pump to control fuel supply to the engine, the weight and size of the fuel system is reduced.

In a preferred embodiment, the pressure raising valve includes:
  a pressure raising valve member exposed to fuel pressure within a reference chamber,
  an inlet to which fuel at supply pressure is supplied, wherein the pressure raising valve member is movable against a force due to pressure within the reference chamber by means of fuel at supply pressure,
  an outlet through which fuel at delivery pressure is supplied to the engine, and
  feedback means for permitting fuel at delivery pressure to flow to the reference chamber.

It will be recalled that conventionally the pressure raising valve is referenced to the inlet pressure of the high pressure pump (LP) so that the pressure raising valve sets a minimum value for (HP–LP). Here the pressure raising valve is referenced to it's own delivery pressure.

By referencing the pressure raising valve member to delivery pressure, rather than to low pressure, a degree of control of fuel flow rate with engine speed is permitted at low flow rates.

Conveniently the system further includes an electrically driven positive displacement pump, whereby said centrifugal pump and said positive displacement pump can be utilised together to supply fuel to an engine Alternatively said centrifugal pump can be utilised to supply fuel to main burners of an engine and said positive displacement pump can be used to supply fuel to the pilot burners of the engine.

According to a second aspect of the present invention, there is provided a linearised pressure raising valve including:
  a pressure raising valve member exposed to fuel pressure within a reference chamber,
  an inlet to which fuel at supply pressure is supplied, wherein the pressure raising valve member is movable against a force due to pressure within the reference chamber by means of fuel at supply pressure, an outlet through which fuel at delivery pressure is supplied, and feedback means for permitting fuel at delivery pressure to flow to the reference chamber.

In a further preferred embodiment, the linearised pressure raising valve includes spring means arranged to act in combination with pressure within the reference chamber against the fuel supply pressure, wherein the spring means has a relatively high spring rate.

Desirably said linearised pressure raising valve comprises a combined flow-sensing and pressure raising valve in a common housing.

BRIEF DESCRIPTION OF THE DRAWINGS

The present invention will now be described, by way of example only, with reference to the accompanying drawings in which.

DETAILED DESCRIPTION OF PREFERRED EMBODIMENTS

Figure 1:
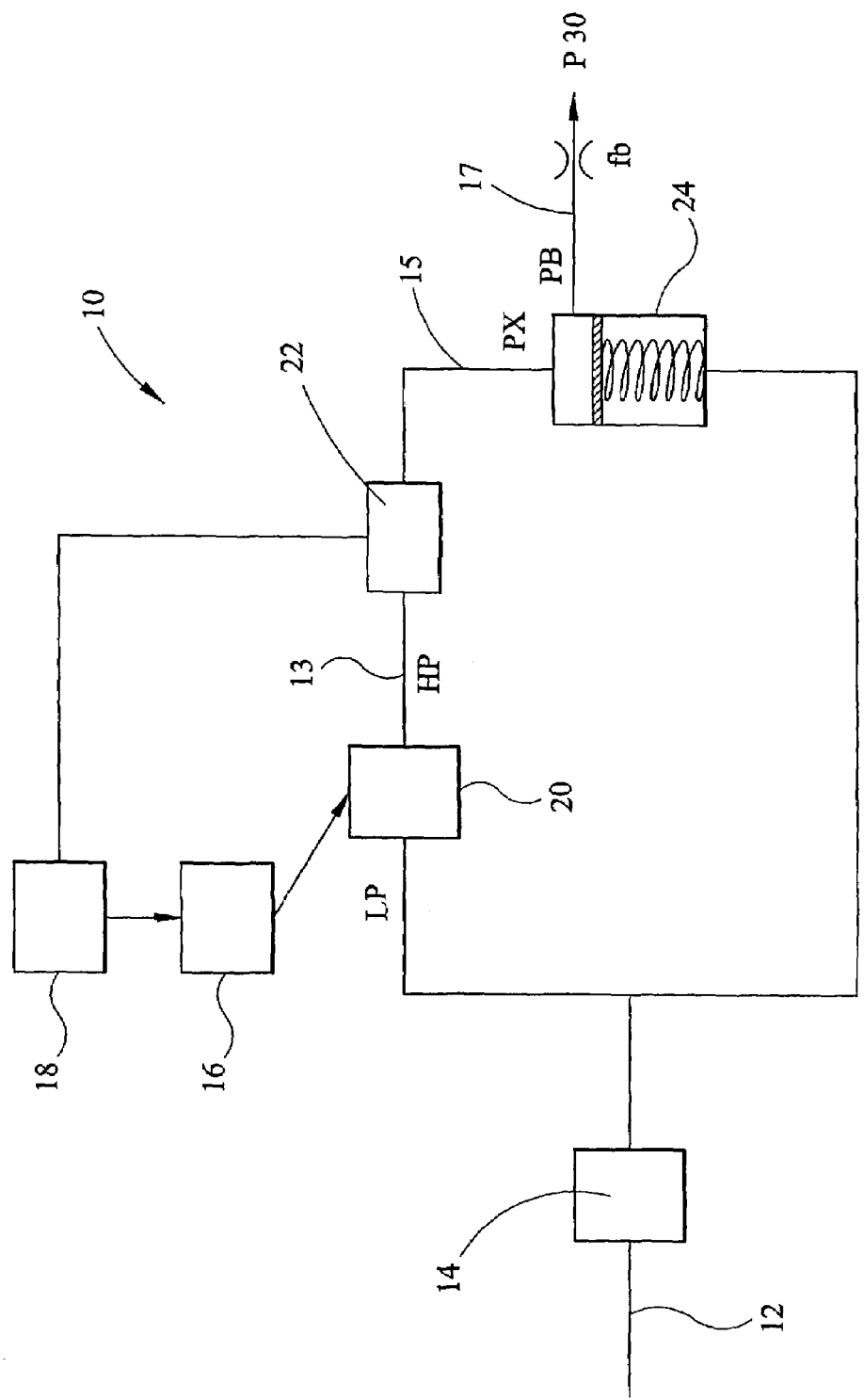
FIG. 1 is a schematic block diagram of a control system for controlling the fuel supply to a combustion engine where the high pressure pump is an electrically driven gear pump.

Referring to FIG. 1, there is shown a fuel control system 10 for controlling the supply of fuel to a combustion engine. Fuel is supplied to the system 10 from a fuel tank or other store (not shown) on a first fuel line 12 by means of an electrically driven low pressure pump 14. Typically, the low pressure pump 14 may be a Centrifugal (CF) Pump.

Fuel from the low pressure pump 14 is supplied to a primary fuel pump in the form of an electrically driven gear pump 20 which displaces fuel in the first fuel line 12 and delivers it at high pressure through an outlet to a second fuel line 13 downstream of the gear pump 20. The gear pump 20 is connected to, and driven by, an electric motor 16, which is itself controlled by an electronic motor control unit 18.

High pressure fuel is supplied through the second fuel line 13 to a flow sensing valve (FSV) 22 which is arranged to monitor the flow of fuel to the engine through a third fuel line 15 downstream of the FSV 22. The FSV 22 is of conventional form such as that described in co pending patent application number GB 9525370.4, in the name of the present applicant, and is arranged to exhibit a constant pressure drop across the valve which is not dependent upon the flow of fuel therethrough.

A piston is movable in response to an increase or decrease in the rate of flow of fuel through the flow sensing valve such that the position of the piston indicates the instantaneous flow of fuel along the second fuel line 13. The position of the piston is sensed by a LVDT which generates an output signal representative of the flow of fuel through the FSV. The output signal from the LVDT is applied to the motor control unit 18 which controls the speed of the motor 16 driving the gear pump in response thereto.

Downstream of the FSV 22, fuel at supply pressure PX, in the third fuel line 15 is supplied to a pressure raising valve (PRV) 24, from where fuel is supplied through a further fuel line 17 at delivery pressure, PB, to the engine. The PRV 24 comprises a cylinder which is divided into first and second chambers by means of a piston, the latter being slidable within the cylinder. The piston is spring-biased towards the first chamber which is supplied with the fuel at supply pressure PX from the third fuel line 15. The second chamber is supplied with fuel at a datum pressure which is usually the low pressure (LP) fuel from the low pressure pump 14.

The PRV 24 is used to ensure that the fuel pressure in the fuel line 15 (PX) is maintained at a fixed minimum amount above the datum pressure. The spring rate of the spring, i.e. the force required to compress the spring by a predetermined amount, is made low so that even small changes in pressure in the fuel line 17 upstream of the PRV 24 are sufficient to cause the piston to move in order to adjust the pressure in the fuel line so as to keep the pressure at the fixed minimum amount above the datum pressure. From the PRV 24, the fuel is supplied to the injectors of the combustion engine.

The system of FIG. 1 is adequate where the primary pump is a gear pump since the rate of change of fuel flow with pump speed is approximately linear and substantially independent of the flow through it. Thus, an electric motor can be used to drive the pump and the flow of fuel to the engine can be controlled simply by varying the speed of the motor, and hence the pump. As stated above, however, a disadvantage of this system is that the relatively low rotational speed of the gear pump requires a larger, and hence heavier, motor to drive it.

It would be highly advantageous to replace the gear pump with a centrifugal (CF) pump. This type of pump is well known and offers the advantage that it is capable of running at considerably higher rotational speeds than conventional gear pumps and thus requires a smaller, and hence lighter, motor to drive it. A problem with centrifugal pumps, however, is that they do not exhibit a linear relationship between pump speed and fuel flow through the pump, rather they produce a pressure which is related to the square of the pump speed and is substantially independent of the flow through it. This is a considerable disadvantage since the PRV will set a relatively constant minimum pump delivery pressure with flow (constant HP–LP) and it is therefore not possible to control fuel flow to the engine simply by controlling pump speed.

By way of an illustrating example, consider the system shown in FIG. 1 where the PRV is referenced to LP but for which both the low pressure pump 14 and the pump 20 are CF pumps. The pressure rise across the pump 20 is proportional to the square of the pump speed, Np:

$$Hp = Kp\, Np^2 + Lp \qquad \text{Equation 1}$$

where Hp is the primary pump supply pressure, Lp is the primary pump inlet pressure and Kp is a constant.

The fuel flow rate, Q, to the engine is given by:

$$Q = fb(PB - P30)^{1/2} \qquad \text{Equation 2}$$

where fb is the flow number of the engine burners (a measure of the restriction to flow presented by the burners), PB is the pressure downstream of the PRV 24 (delivery pressure) and P30 is the combustion chamber pressure.

The pressure drop across the FSV 22 is constant:

$$Hp - PX = K_{FSV} \qquad \text{Equation 3}$$

where PX is the pressure downstream of the FSV 22 (supply pressure) and $K_{FSV}$ is constant.

The pressure drop across the PRV profile is a function of fuel flow:

$$PX - PB = K2\Phi(Q) \qquad \text{Equation 4}$$

where $K2\ \Phi(Q)$ is a rate term for the PRV 24 (commonly referred to as the "valve rate") which relates the fuel flow rate, Q, through the PRV 24 to the pressure drop across it.

Combining Equations 1 to 4, gives:

$$Q^2 = fb^2(Kp\ Np^2 + Lp - K_{FSV} - K2\Phi(Q) - P30) \qquad \text{Equation 5}$$

and linearising and rearranging Equation 5 gives:

$$\frac{\Delta Q}{\Delta N_P} = \frac{2K_P N_P fb^2}{2fb\sqrt{PB - P30} + fb^2 K2\Phi(Q)} \qquad \text{Equation 6}$$

Figure 3:
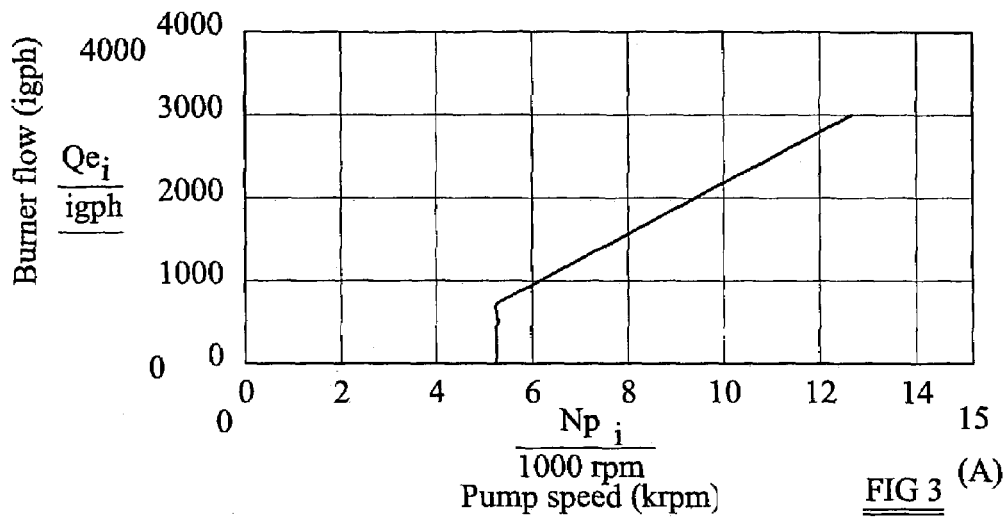
FIGS. 3a to 3c are graphs illustrating fuel flow as a function of pump speed for three different control systems.
Figure 3:
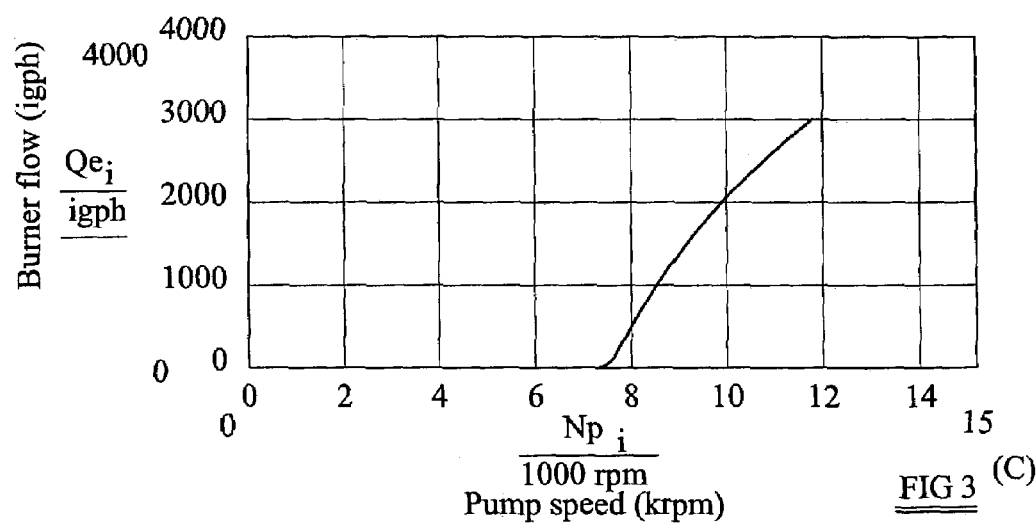
Figure 3:
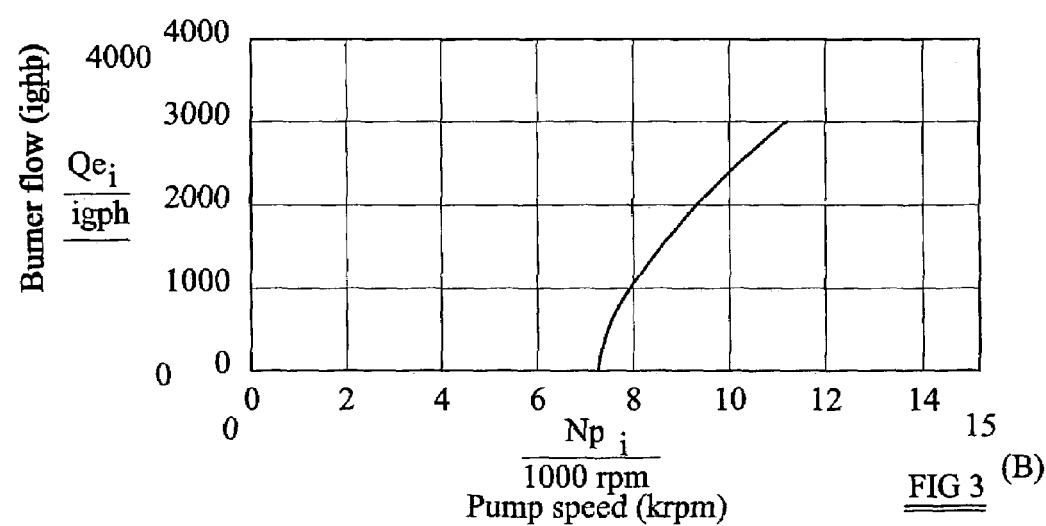

At low flows there is very little pressure drop across the burners so that the term (PB−P30) tends to zero. The rate term, $K2\ \Phi(Q)$, relating the pressure drop across the PRV profile to the flow rate is also very small at low flows. Hence, the term $\Delta Q/\Delta Np$ approaches infinity and it is not therefore possible to control the flow rate as a function of pump speed at low flow rates. This effect is illustrated in FIG. 3A which shows infinite gain at low flow rates.

Figure 2:
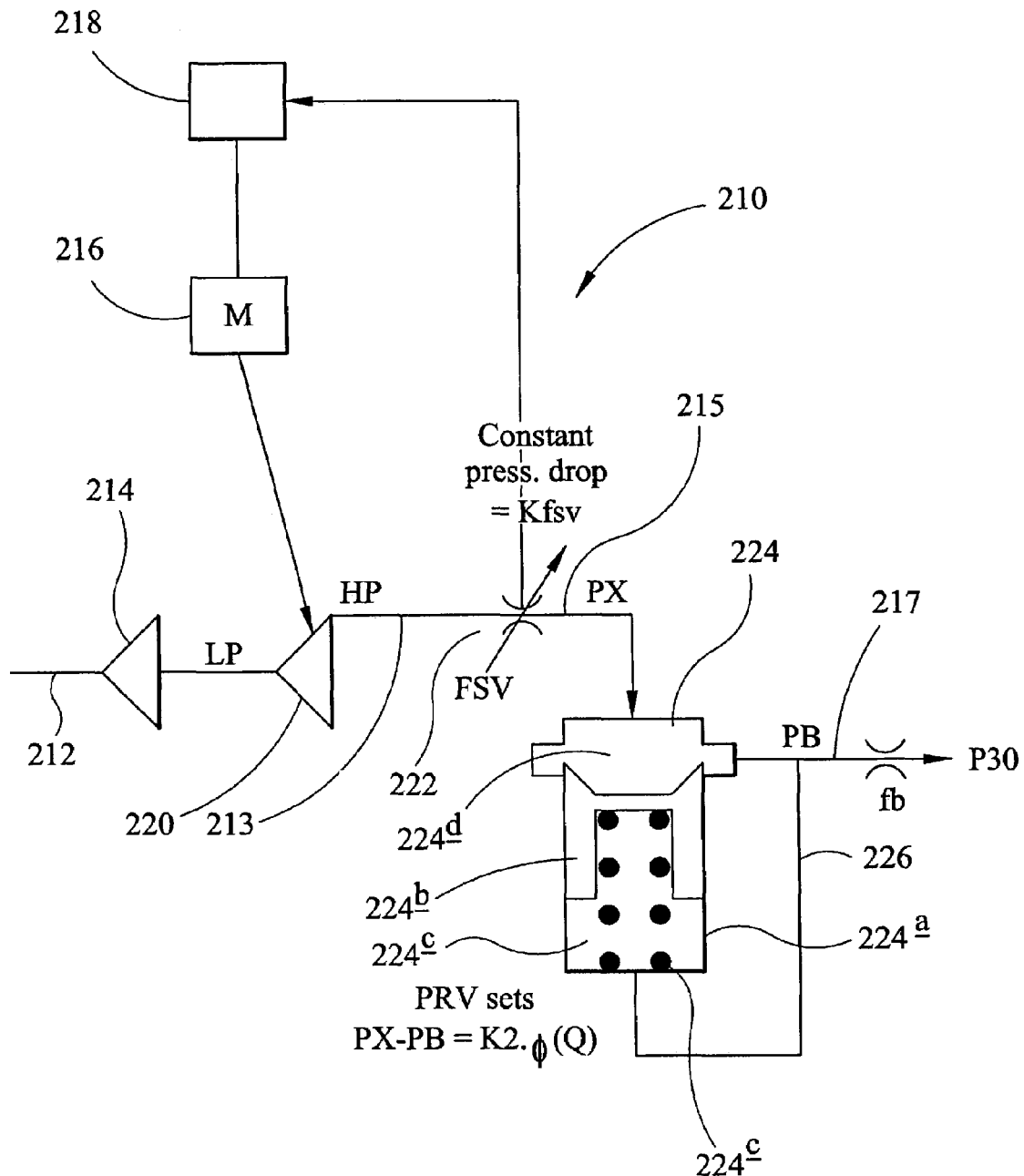
FIG. 2 is a schematic block diagram of a first form of control system according to the invention.

FIG. 2 is a schematic diagram of a preferred form of fuel control system 210 according to the invention which permits the use of an electrically-driven centrifugal pump.

As in the case of the system of FIG. 1, fuel is supplied to the system 210 from a tank or other store (not shown) on a fuel line 212 by means of a low pressure pump 214. The low pressure (LP) fuel is supplied to the primary fuel pump which comprises a centrifugal (CF) pump 220. An electric motor 216 is arranged to drive the CF pump 220 such that, as the speed of the motor is adjusted, the speed of the pump is also varied.

Downstream of the CF pump 220, high pressure fuel (HP) is supplied to a flow sensing valve (FSV) 222 which exhibits a constant pressure drop with varying fuel flow.

Fuel at supply pressure PX is supplied through a PRV inlet to an upper chamber of a pressure raising valve (PRV) 224 similar to that described with reference to FIG. 1. Fuel at a delivery pressure, PB, is supplied through a PRV outlet to a delivery line to the engine. Specifically, the PRV 224 comprises a cylinder 224a having slidably disposed therein a piston 224b which is biased by means of a spring 224c towards the upper end of the cylinder 224a. The piston 224b divides the cylinder into two chambers, an upper chamber 224d, into which fuel at supply pressure PX is supplied, and a lower, reference chamber 224e which is supplied with fuel from the fuel line 212 at a point immediately downstream of the PRV, at delivery pressure PB, through a feedback path 226.

A significant difference between the PRV 224 in the system of FIG. 2 compared with that of FIG. 1 is that a means 226 for feeding back fuel at delivery pressure to the reference chamber is provided. As the reference chamber 224e is supplied with fuel from a fuel line 217 downstream of the PRV 224, then as the pressure of the fuel supplied to the upper chamber 224d varies, the pressure supplied to the reference chamber 224e also varies. It will be appreciated that the downward pressure exerted on the top of the piston is PX, whilst the upward pressure exerted on the piston is given by PB+Ps, where Ps is the pressure applied by the spring. This is in contrast with conventional PRVs where the reference chamber is supplied with fuel at a constant low pressure (LP).

An additional difference between the PRV 224 and conventional PRVs is that the spring within the PRV 224 has a spring rate which is significantly higher than that of a conventional PRV. The reasons for this are discussed below.

From the PRV 224, the fuel is supplied, through a restriction which generates a pressure drop, to the burners of the engine. The discharge fuel pressure to the combustion chamber of the engine, downstream of the restriction, is denoted P30.

The pressure rise in the fuel line 213 generated by the CF pump 220 varies with the square of the pump speed. Equation 6 applies to the system in FIG. 2, and in the case of low flows the (PB−P30) term approaches zero, as described previously. However, in the case of FIG. 2, the term $K2\ \Phi(Q)$ is significant since as the PRV 224 has a considerable rate associated with it, this being provided by a combination of a high rate spring 224c and by referencing the PRV 224 to delivery pressure PB, rather than to low pressure (LP). For the system in FIG. 2, therefore, $\Delta Q/\Delta Np$ is finite at low flows, so that the flow rate can be controlled as a function of pump speed across a full flow range. FIG. 3C shows this flow rate-speed relationship.

At high flow rates there is a significant pressure drop across the burners and the $\Delta Q/\Delta Np$ gain will be relatively linear, even if the spring 224c has a relatively lower rate.

If a low rate spring 224c is used, the $\Delta Q/\Delta Np$ gain is higher at low flows rates but is still controllable since the PRV 224 is referenced to PB rather than to LP. This is illustrated in FIG. 3B.

A flow sensing valve (FSV) 222 monitors the fuel flow rate between the fuel lines 213 and 215 and gives an accurate measurement of fuel flow at any condition. The FSV 222 position is a unique measure of the flow and a linear variable differential transformer (LVDT) is used to provide a control signal to the electronic motor control unit. This signal is compared with a signal representative of the fuel flow demand and the motor control unit adjusts the speed of the motor, and hence the pump, in dependence on the difference or error between the actual and demanded flow rates. Using this closed loop feedback control system, the speed of the motor, and hence the pump, is varied until the correct flow is achieved (zero error).

It will be understood from the foregoing that the present invention allows the use of electrically driven centrifugal pumps as the primary fuel pump in a fuel control system for a combustion engine by compensating for the disadvantageous Q/Np characteristics inherent with such pumps. Furthermore, the invention permits the system to exhibit a substantially linear relationship between fuel flow rate and pump speed and thus enables control of the fuel flow to the engine by varying the pump speed alone. Essentially, this is achieved by providing a PRV 224 where the back of the piston within the PRV is referenced to the delivery pressure downstream of the PRV 224 and where the spring rate of the spring within the PRV is made significantly higher than for conventional PRVs.

Figure 4:
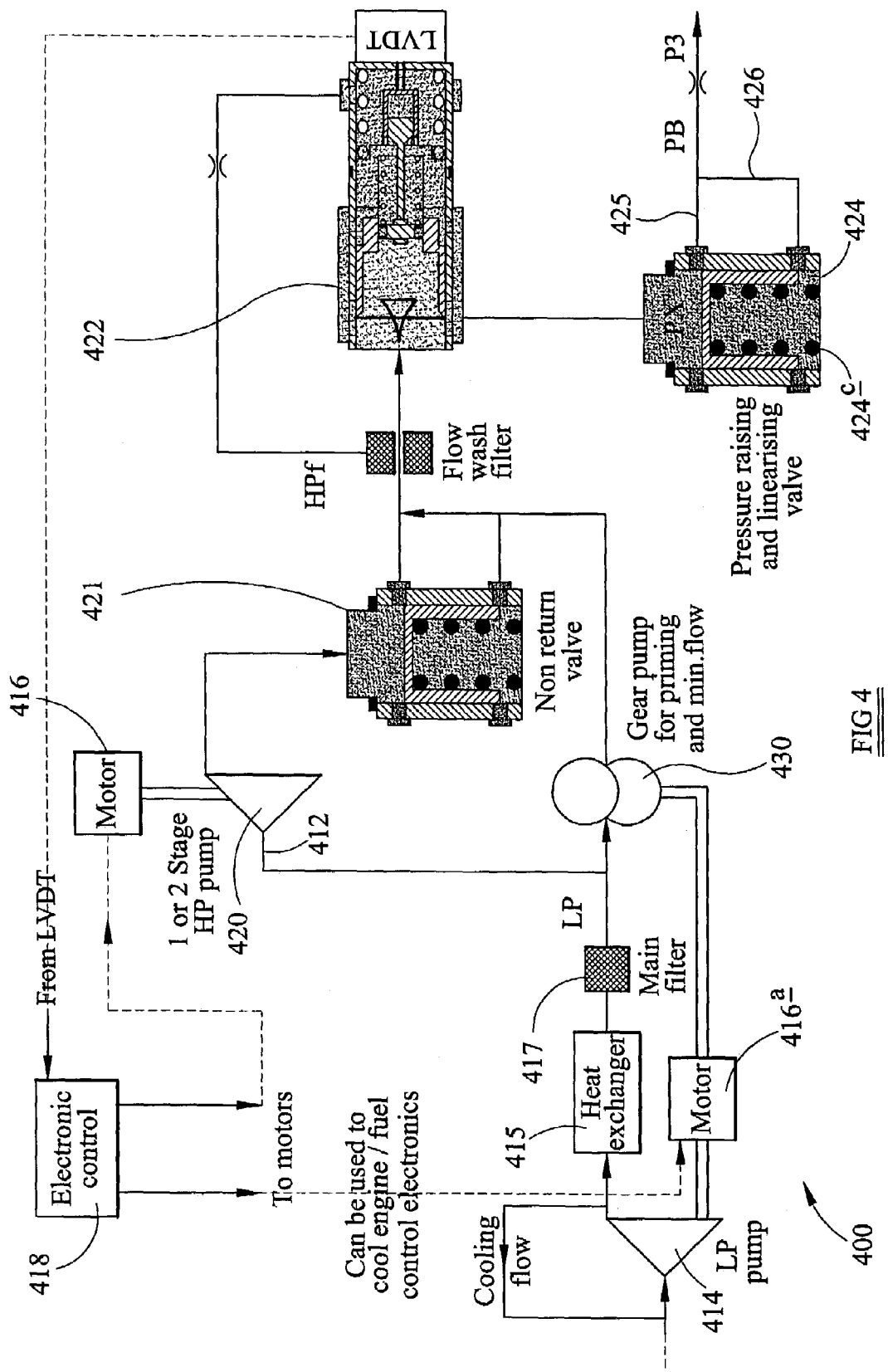
FIG. 4 is a schematic block diagram of a first practical implementation of the control system of FIG. 2.

FIG. 4 illustrates in more detail a practical implementation 400 of the control system of FIG. 2 employing such a modified PRV. As described with reference to FIG. 2, fuel from a fuel tank or store (not shown) is supplied to a low pressure pump 414. The low pressure pump 414 delivers fuel at a low pressure, via a heat exchanger 415 and a main filter 417 to the primary centrifugal pump 420. The centrifugal pump 420 is driven by means of an electric motor 416 which is controlled by an electronic control unit 418. The centrifugal pump 420 is arranged to deliver fuel at a high pressure (HP) to the burners in the engine via a series of valves, as described below.

From the centrifugal pump 420, fuel at a high pressure is supplied to a non-return valve (NRV) 421. The NRV is of conventional form comprising a cylinder having a piston slidably disposed therein. The piston effectively divides the cylinder internally into two chambers, an upper chamber having an inlet and an outlet and a lower chamber having only an inlet. The high pressure fuel from the centrifugal pump 420 is supplied to the inlet of the upper chamber of the NRV 421 and exits from the outlet.

The piston within the NRV 421 is spring-biased towards the upper chamber of the NRV such that if the pressure of the fuel in the upper chamber falls below a predetermined pressure, the piston moves to a position whereby the outlet in the upper chamber is blocked, for reasons described below.

The high pressure fuel from the outlet of the upper chamber of the NRV 421 is then supplied to a flow sensing valve (FSV) 422. The FSV 422, which is preferably, but not necessarily, of the type described in co pending British Patent Application No. GB 9525370.4, comprises a cylinder having a servo piston slidably mounted therein. The position of the servo piston within the cylinder is determined by the flow rate of fuel through a chamber in the FSV defined by the cylinder and the piston. The position of the piston, which indicates the rate of the flow of fuel through the FSV, is measured by an LVDT associated with the FSV 422 which generates a control signal representative of the fuel flow rate. This signal is applied to the electronic control unit 418 which compares the actual flow rate as measured by the FSV with the desired flow rate and adjusts the speed of the motor driving the CF pump in dependence on the error.

The FSV 422 contains an intricate valve arrangement which includes a poppet valve grounded by a spring to the valve piston which, in turn, is grounded to the valve body by another spring. This ensures the pressure drop across the FSV is fixed and does not vary with fuel flow through the FSV.

From the FSV 422, the high pressure fuel at supply pressure is supplied to the modified PRV 424. As described with reference to FIG. 2, the PRV 424 is broadly similar in construction to the NRV 421 having a cylinder divided internally into upper and lower chambers by means of a slidable piston which is spring-biased towards the upper chamber. The upper chamber has an inlet and an outlet whilst the lower chamber has only a single inlet/outlet.

The PRV outlet from the upper chamber is connected to a fuel supply line 425 which conducts fuel to the engine burners (not shown). The inlet/outlet of the lower, reference chamber is connected by a feedback line 426 to the supply line 425 such that the pressure of the fuel within the reference chamber is that substantially immediately downstream of the PRV 424. In addition, the spring rate of the spring within the PRV is relatively high compared to that of a conventional PRV.

The system 400 also includes a second pump 430, comprising a gear pump or other positive displacement pump, which is supplied with low pressure fuel from the low pressure pump 414 and feeds it, at an intermediate pressure, to a point in the fuel line 412 immediately downstream of the NRV 421, i.e. at a point intermediate the NRV 421 and the FSV 422. In addition, the intermediate pressure fuel from the gear pump 430 is supplied to the lower chamber of the NRV 421 via the inlet. The gear pump 430 and the low pressure pump 414 may both be driven by a common electric motor 416 or each may be driven independently by motors 416 and 416a as shown in FIG. 4.

The purpose of the gear pump 430 is twofold: primarily, the gear pump 430 is used to provide a priming function for the LP pump 414 and the associated fuel lines 412. The LP pump 414 is not capable of self priming and so the gear pump is used to pump air from upstream of the LP pump and to compress the air in the Fuel Metering Unit (FMU) until the LP pump 414 primes. Once primed, the LP pump 414 produces a sufficient pressure rise to automatically prime the centrifugal pump 420.

The other function of the gear pump 430 is to provide a minimum flow to the engine burners to ensure that they remain alight at all times. As described above, at low operating speeds, the centrifugal pump 420 does not generate sufficient pressure to pump fuel to the burners. However, the point at which the pressure generated by the pump becomes insufficient to produce fuel flow to the burners is indeterminate and varies from pump to pump and with fuel specific gravity.

The gear pump 430 overcomes this problem by providing a minimum flow to the burners which is used at all times during operation of the engine. This ensures that, for example during so-called "slam" decelerations, the flow to the burners never falls below the minimum required to prevent flameout.

If the pressure from the centrifugal pump 420 falls below a predetermined level, the NRV 421 closes so that fuel from the gear pump 430 cannot flow back through the centrifugal pump 420 to the LP pump 414.

Shut down of the system is effected by stopping the motors 416 driving the pumps. Although the response of the motors should be sufficient to provide a rapid shut down of the fuel control system if required, an additional shut down servo valve may be included which switches high pressure fuel to the lower chamber of the PRV 424 thus causing the PRV to close and immediately cutting off the flow of fuel to the burners.

Figure 5:
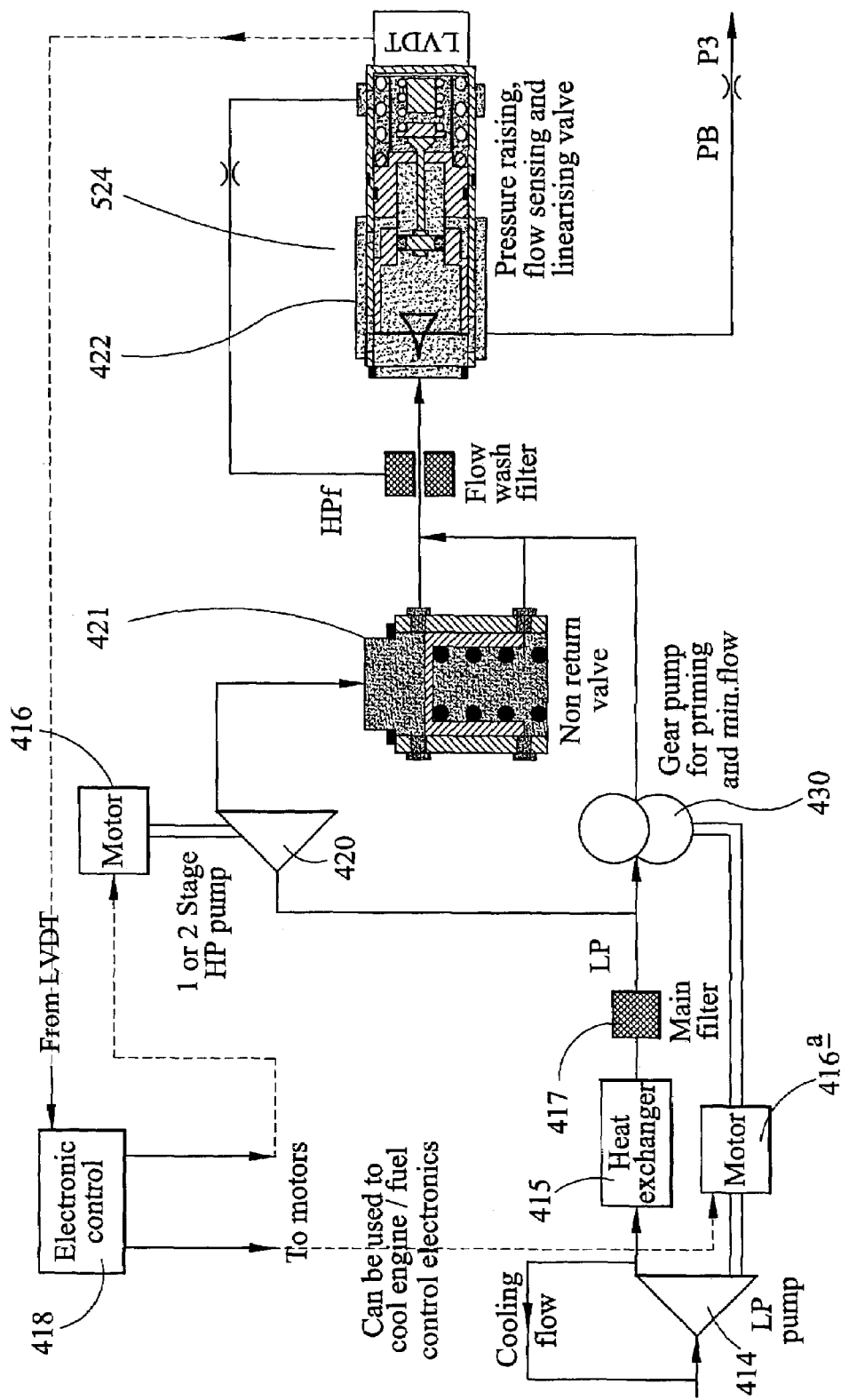
FIG. 5 is a schematic block diagram of a second practical implementation of the control system of FIG. 2.

In a modification to the above system, shown in FIG. 5, the FSV 422 and modified PRV 424 are replaced by a combined flow sensing and pressure raising valve (FSPRV) 524 within a common housing.

The essential modification to the existing FSV 422 which enables it to act in the same manner as the modified PRV 424 is that the pressure drop spring of the poppet valve is grounded to the cylinder body rather than to the main servo piston. It can be seen that at all flow levels the opening of the poppet valve (i.e. the position of the poppet valve relative to the position of the main servo piston position) is relatively constant. Moreover, as flow increases the main piston moves to open a metering port and compress the main spring. Since the relative position of the main piston remains substantially constant, it follows that the spring acting on the poppet valve is also compressed, thereby increasing the load on the poppet valve. This spring load determines the FSV pressure drop set by the poppet valve, and thus increasing flow results in an increasing FSV pressure drop giving a similar characteristic to the modified PRV 224.

This simple modification to the existing FSV provides the effect that the flow rate through the valve, and hence to the burners, remains substantially linear with pump speed, as in the case of the modified PRV. The FSPRV 524 does not exhibit the constant pressure drop across it irrespective of fuel flow rate as in the case of the conventional FSV 422. This is of little concern, however, since the position of the valve still provides a unique indication of flow through the valve and a simple recalibration of the valve would enable it to be used as a FSV albeit in a non-linear manner.

The FSPRV 524 thus provides the four functions associated with the individual FSV and PRV of the system of FIG. 4; that is to say it provides an indication of the flow rate to the engine burners, it acts to linearise the flow rate at low pump speeds it acts as a pressure raising valve, and it acts as a shut-off valve (at shutdown it seals fuel in the FMU from the manifold).

The above systems are described with reference to non-staged combustion engines where there is only single set of burners. It will be appreciated, however, that the invention is equally applicable to, and has considerable advantages in, staged combustion engines where there are more than one set of burners, for example a set of pilot burners and one or more sets of main burners.

In the system of FIGS. 4 and 5, two pumps are provided; a main centrifugal pump 420 which provides the main flow of fuel to the burners and a secondary gear pump 430 which acts to prime the LP and HP pumps and to provide a minimum pressure to the burners.

Figure 6:
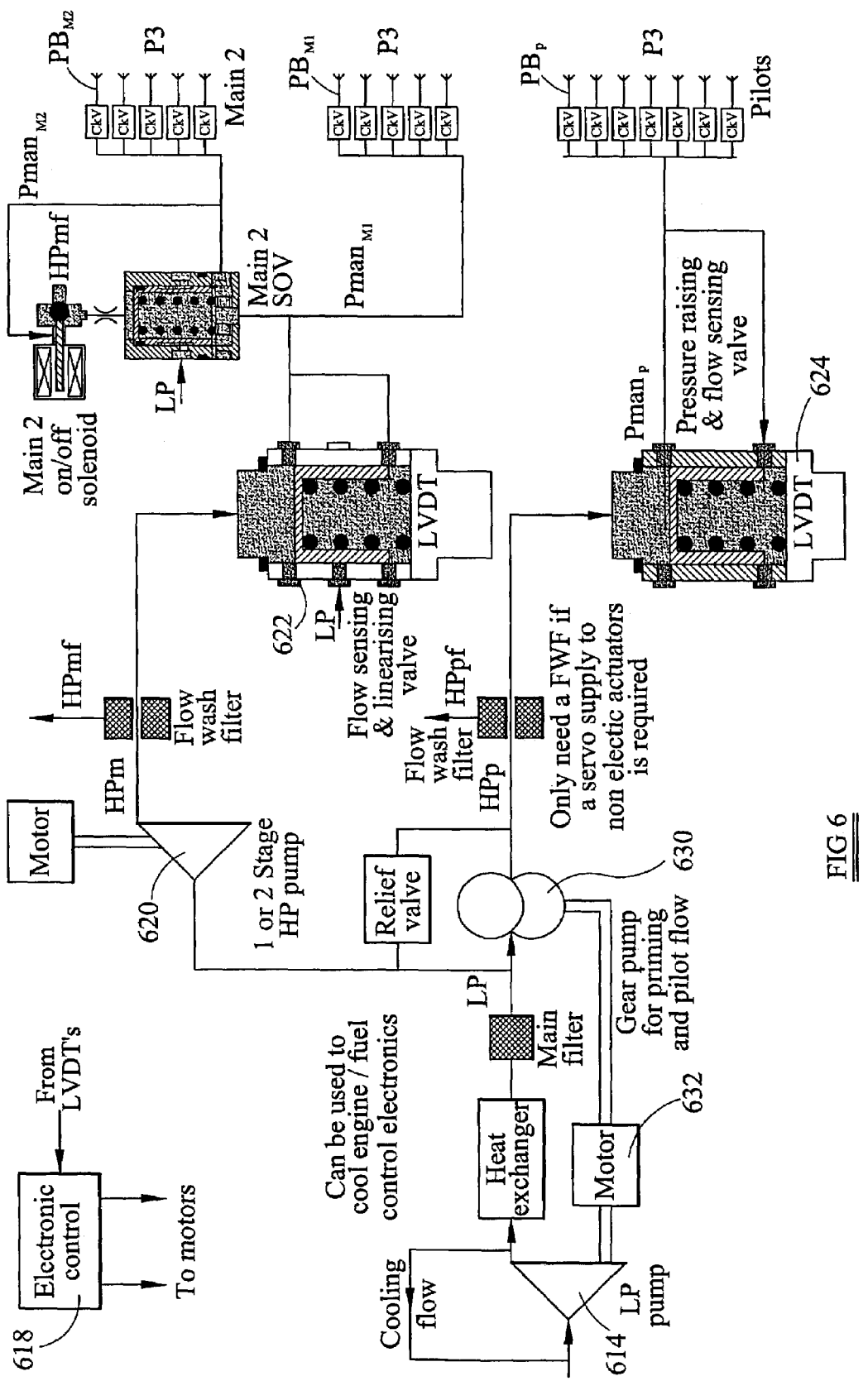
FIG. 6 is a schematic block diagram of a third practical implementation of the control system of FIG. 2.

Such a duplicity of pumps could be employed in a staged system so that the centrifugal pump supplies the main flow of fuel to the main burners whilst the gear pump provides flow to the pilot burners. Such a system is illustrated in FIG. 6.

Here, low pressure fuel from the LP pump 614 is supplied to both the gear pump 630 and the CF pump 620. The gear pump 630 supplies fuel at a high pressure to the pilot burners via a combined flow sensing and pressure raising valve (FSPRV) 624. This may be in the form of a conventional PRV having an LVDT associated with it for measuring the position of the piston within the PRV.

The flow of fuel to the pilot burners is controlled by varying the speed of the electric motor 632 which is shown driving the gear pump 630 and the low pressure pump 614. The flow produced is proportional to the speed of the gear pump and so no additional linearising effect is required from the FSPRV 624 which acts to maintain the pressure of the fuel HPp a fixed amount above the delivery pressure Pmanp and to provide a measurement of the flow rate to the burners. The LVDT feedback signal is compared to the flow demand to the burners and the error is used to drive the electric motor 632 to the gear pump. The speed of the motor is adjusted until the correct flow is achieved.

The FSPRV also maintains a minimum system pressure rise sufficient to provide enough force to move the various valves and any external actuators. The gear pump also provides a means of priming the system and maintains the pilot flow at a sufficient level to prevent flameout of the pilot burners. Should a flameout of the main burners occur, for example, if the fuel flow to the burners stops owing to a rapid deceleration of the centrifugal pump, as in a slam deceleration, it should be possible to relight them by way of the pilot burners. In the event that the main burners flameout, provided that the pilot burners are maintained, the main burners can be readily ignited if required. The gear pump provides the necessary minimum pressure to maintain operation of the pilot burners.

The centrifugal pump 620 is used to supply fuel to the main burners. Since, as described above, fuel flow from the centrifugal pump is not linear with pump speed, a FSPRV 622 which provides a linearising function is included in the flow path. The FSPRV may be a modified PRV having an LVDT associated with it for measuring the position of the piston within the PRV. Alternatively, the FSPRV 622 may be of the form described with reference to FIG. 5.

As described above, the FSPRV 622 ensures that at low pump speeds the $\Delta Q/\Delta Np$ gain does not become infinite so that it is possible to control the flow of fuel to the burners simply by controlling the speed of the motor 616 driving the pump 620, as it is possible to do with conventional gear pumps.

Again, the LVDT associated with the FSPRV 622 generates a signal indicative of the flow rate of fuel through the FSPRV which is applied to the motor control unit 618. The motor control unit 618 compares the signal with a signal representative of the desired fuel flow rate to the burners and controls the speed of the motor to minimise the difference or error between the signals.

From the FSPRV 622, the high pressure fuel is supplied to the main burners of the engine. If a second set of main burners is employed, a shut off valve to the second set of main burners may be provided if required.

The invention claimed is:

1. A fuel control system for a combustion engine, the system comprising:
   an electrically driven centrifugal pump operable at a pump speed, wherein the pump is arranged to supply pressurised fuel to the engine, and
   a pressure raising valve for ensuring the pressure of fuel within the fuel control system is maintained above a predetermined, minimum amount, wherein the pressure raising valve is adapted to provide a substantially linear variation of fuel flow rate to the engine with pump speed.

2. A fuel control system as claimed in claim 1 wherein, the pressure raising valve includes:
   a pressure raising valve member exposed to fuel pressure within a reference chamber,
   an inlet to which fuel at supply pressure is supplied, wherein the pressure raising valve member is movable against a force due to pressure within the reference chamber by means of fuel at supply pressure,
   an outlet through which fuel at delivery pressure is supplied to the engine, and
   feedback means for permitting fuel at delivery pressure to flow to the reference chamber.

3. A fuel control system as claimed in claim 2 wherein, the pressure raising valve includes spring means arranged to act in combination with pressure within the reference chamber against the fuel supply pressure, wherein the spring means has a relatively high spring rate.

4. A fuel control system as claimed in claim 1 including an electrically driven positive displacement pump, whereby said centrifugal pump and said positive displacement pump can be utilised together to supply fuel to an engine.

5. A fuel control system as claimed in claim 4 wherein said centrifugal pump can be utilised to supply fuel to main burners of an engine and said positive displacement pump can be used to supply fuel to the pilot burners of the engine.

* * * * *